(12) United States Patent
    Grams

(10) Patent No.: US 11,270,224 B2
(45) Date of Patent: Mar. 8, 2022

(54) AUTOMATIC GENERATION OF TRAINING DATA FOR SUPERVISED MACHINE LEARNING

(71) Applicant: Konica Minolta Business Solutions U.S.A., Inc., San Mateo, CA (US)

(72) Inventor: Jason James Grams, Westminster, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 1014 days.

(21) Appl. No.: 15/941,815

(22) Filed: Mar. 30, 2018

(65) Prior Publication Data

US 2019/0303800 A1    Oct. 3, 2019

(51) Int. Cl.
    *G06F 16/583*    (2019.01)
    *G06N 20/00*     (2019.01)
    *G06F 16/80*     (2019.01)
    *G06F 16/93*     (2019.01)

(52) U.S. Cl.
    CPC .......... *G06N 20/00* (2019.01); *G06F 16/583* (2019.01); *G06F 16/80* (2019.01); *G06F 16/93* (2019.01)

(58) Field of Classification Search
    CPC .............. G06N 99/005; G06N 20/00; G06F 17/30011; G06F 17/30908; G06F 17/30247; G06F 16/583; G06F 16/93; G06F 16/80
    See application file for complete search history.

(56) References Cited

U.S. PATENT DOCUMENTS

| 8,135,669 | B2* | 3/2012 | Olstad ................. G06F 16/907 |
| | | | 707/608 |
| 9,008,840 | B1 | 4/2015 | Ponulak et al. |
| 10,586,178 | B1* | 3/2020 | Carr ..................... G06F 16/93 |
| 2005/0027664 | A1 | 2/2005 | Johnson et al. |
| 2008/0097985 | A1* | 4/2008 | Olstad ................. G06F 16/907 |
| 2013/0067319 | A1 | 3/2013 | Olszewski et al. |
| 2013/0097103 | A1 | 4/2013 | Chari et al. |
| 2017/0060993 | A1 | 3/2017 | Pendar et al. |
| 2018/0197087 | A1* | 7/2018 | Luo ....................... G06N 20/00 |

(Continued)

FOREIGN PATENT DOCUMENTS

CN    106709513 A    5/2017
CN    104992184 B    3/2018

*Primary Examiner* — Anil K Bhargava
(74) *Attorney, Agent, or Firm* — Osha Bergman Watanabe & Burton LLP (57) ABSTRACT

A method is disclosed for training a machine learning model to process electronic documents (EDs). The method includes obtaining a structured ED (SED) from a document repository, where the SED includes a first metadata. The method further generates, based on the SED, a bitmap and a second metadata. The method also determines whether the second metadata is within a predetermined threshold of the first metadata and generates, based on the SED and in response to determining that the second metadata is not within the predetermined threshold of the first metadata, a third metadata. The method additionally determines whether the third metadata is within the predetermined threshold of the first metadata and stores, in response to determining that the third metadata is within the predetermined threshold of the first metadata, a second SED comprising the bitmap and the third metadata.

20 Claims, 6 Drawing Sheets

(56) References Cited

U.S. PATENT DOCUMENTS

| | | | |
|---|---|---|---|
| 2018/0300296 A1* | 10/2018 | Ziraknejad | G06F 16/93 |
| 2018/0349449 A1* | 12/2018 | Lindley | G06F 3/0482 |
| 2019/0147103 A1* | 5/2019 | Bhowan | G06N 5/022 |
| | | | 707/737 |
| 2021/0089589 A1* | 3/2021 | Cerino | G06F 40/169 |

* cited by examiner

```
<resolution = 300/>
<margins>
    <top = 300/>
    <bottom = 300/>
    <left = 300/>
    <right = 300/>
</margins>
```

Metadata
420

AUTOMATIC GENERATION OF TRAINING DATA FOR SUPERVISED MACHINE LEARNING

BACKGROUND

An electronic document (ED) processing system may parse both structured and unstructured EDs. An ED system may use machine learning in order to infer document characteristics and contents. Typically, such ED systems utilize labeled or customized training sets to establish a baseline for the machine learning program. Further, the machine learning systems typically require large sets of training data in order to be effective. In many cases, machine learning is dependent on supervised learning or otherwise curated training data sets. Often, such training may require human input in order to indicate an intended result rendering the process potentially tedious or prone to human error.

SUMMARY

In accordance with embodiments of the invention, a method is disclosed for training a machine learning model to process electronic documents (EDs), the method comprises: obtaining a structured ED (SED) from a document repository, wherein the SED comprises a first metadata; generating, based on the SED, a bitmap and a second metadata; determining whether the second metadata is within a predetermined threshold of the first metadata; generating, based on the SED and in response to determining that the second metadata is not within the predetermined threshold of the first metadata, a third metadata; determining whether the third metadata is within the predetermined threshold of the first metadata; and storing, in response to determining that the third metadata is within the predetermined threshold of the first metadata, a second SED comprising the bitmap and the third metadata.

In some aspects, the method further comprises: obtaining a third SED from the document repository, wherein the third SED comprises a fourth metadata; generating, based on the third SED, a second bitmap and a fifth metadata; determining whether the fifth metadata is within the predetermined threshold of the fourth metadata; and storing, in response to determining that the fifth metadata is within the predetermined threshold of the fourth metadata, a fourth SED comprising the second bitmap and the fifth metadata.

In some aspects, the method further comprises: obtaining an unstructured ED (UED); generating, based on the UED, a third bitmap and a fifth metadata; and storing a third SED comprising the third bitmap and the fifth metadata.

In some aspects of the method, the UED comprises one or more scanned images of a physical document.

In some aspects of the method, the UED comprises one or more images.

In some aspects of the method, the UED is in a format selected from a list consisting of: PDF, PostScript, PNG, BMP, and JPG.

In some aspects of the method, the SED is in a format selected from a list consisting of: OOXML, ODF, HTML, DOC, DOCX, TXT, RTF.

In accordance with embodiments of the invention, a non-transitory computer readable medium (CRM) is disclosed storing computer readable program code for training a machine learning model to process EDs and the computer readable program code causes a computer to: obtain a structured ED (SED) from a document repository, wherein the SED comprises a first metadata; generate, based on the SED, a bitmap and a second metadata; determine whether the second metadata is within a predetermined threshold of the first metadata; generate, based on the SED and in response to determining that the second metadata is not within the predetermined threshold of the first metadata, a third metadata; determine whether the third metadata is within the predetermined threshold of the first metadata; and store, in response to determining that the third metadata is within the predetermined threshold of the first metadata, a second SED comprising the bitmap and the third metadata.

In some aspects of the non-transitory CRM, the computer readable program code further causes the computer to: obtain a third SED from the document repository, wherein the third SED comprises a fourth metadata; generate, based on the third SED, a second bitmap and a fifth metadata; determine whether the fifth metadata is within the predetermined threshold of the fourth metadata; and store, in response to determining that the fifth metadata is within the predetermined threshold of the fourth metadata, a fourth SED comprising the second bitmap and the fifth metadata.

In some aspects of the non-transitory CRM, the computer readable program code further causes the computer to: obtain an unstructured ED (UED); generate, based on the UED, a third bitmap and a fifth metadata; and store a third SED comprising the third bitmap and the fifth metadata.

In some aspects of the non-transitory CRM, the UED comprises one or more scanned images of a physical document.

In some aspects of the non-transitory CRM, the UED comprises one or more images.

In some aspects of the non-transitory CRM, the UED is in a format selected from a list consisting of: PDF, PostScript, PNG, BMP, and JPG.

In some aspects of the non-transitory CRM, the SED is in a format selected from a list consisting of: OOXML, ODF, HTML, DOC, DOCX, TXT, RTF.

In accordance with embodiments of the invention, a system is disclosed for training a machine learning model to process EDs, the system comprising: a memory; and a computer processor connected to the memory that: obtains a structured ED (SED) from a document repository, wherein the SED comprises a first metadata; generates, based on the SED, a bitmap and a second metadata; determines whether the second metadata is within a predetermined threshold of the first metadata; generates, based on the SED and in response to determining that the second metadata is not within the predetermined threshold of the first metadata, a third metadata; determines whether the third metadata is within the predetermined threshold of the first metadata; and stores, in response to determining that the third metadata is within the predetermined threshold of the first metadata, a second SED comprising the bitmap and the third metadata.

In some aspects of the system, the processor further: obtains a third SED from the document repository, wherein the third SED comprises a fourth metadata; generates, based on the third SED, a second bitmap and a fifth metadata; determines whether the fifth metadata is within the predetermined threshold of the fourth metadata; and stores, in response to determining that the fifth metadata is within the predetermined threshold of the fourth metadata, a fourth SED comprising the second bitmap and the fifth metadata.

In some aspects of the system, the processor further: obtains an unstructured ED (UED); generates, based on the UED, a third bitmap and a fifth metadata; and stores a third SED comprising the third bitmap and the fifth metadata.

In some aspects of the system, the UED comprises one or more scanned images of a physical document.

In some aspects of the system, the UED is in a format selected from a list consisting of: PDF, PostScript, PNG, BMP, and JPG.

In some aspects of the system, the SED is in a format selected from a list consisting of: OOXML, ODF, HTML, DOC, DOCX, TXT, RTF.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system of training a machine learning model to process EDs. The method, CRM, and system may utilize and update a machine learning model for processing EDs to determine various metadata about the EDs. For example, existing structured EDs may be utilized to train a machine learning model for processing EDs. That is, the metadata from a structured ED may be used and the ED may be processed by the machine learning model as an unstructured ED so that structural metadata may be generated for the ED in addition to a bitmap. The generated metadata may then be compared to the existing metadata to improve the metadata recognition by the machine learning model.

In one or more embodiments, metadata may be derived from an ED to generate an ED that is editable by a user. In other words, an ED may be converted from an uneditable form to an editable form. For example, a physical document may be scanned into a computing system and subsequently processed into a user editable form. Metadata may be generated for the ED describing, for example, the layout, margins, fonts, and other parameters typically associated with structure EDs. Furthermore, as mentioned above, one or more embodiments of the invention may utilize repositories of existing structured EDs to train a machine learning system or machine learning model. In other words, the document processing system uses structured EDs having metadata to train a document processor based on a machine learning model.

In one or more embodiments, parameters which are encoded in the input file can be trained into the machine learning model. As such, documents created via Page Description Languages (PDLs) such as PDF, Postscript, and the like may provide less training opportunity compared to structured ED formats such as OOXML. This is because PDLs typically position objects in an absolute manner and may not set document characteristics in a way that affect the layout. Structured ED formats, on the other hand, typically must set a large number of parameters which affect the layout of the output, thereby supplying a larger number of parameters to derive. Accordingly, one or more embodiments of the invention may utilize structured ED to train a machine learning model.

Figure 1:
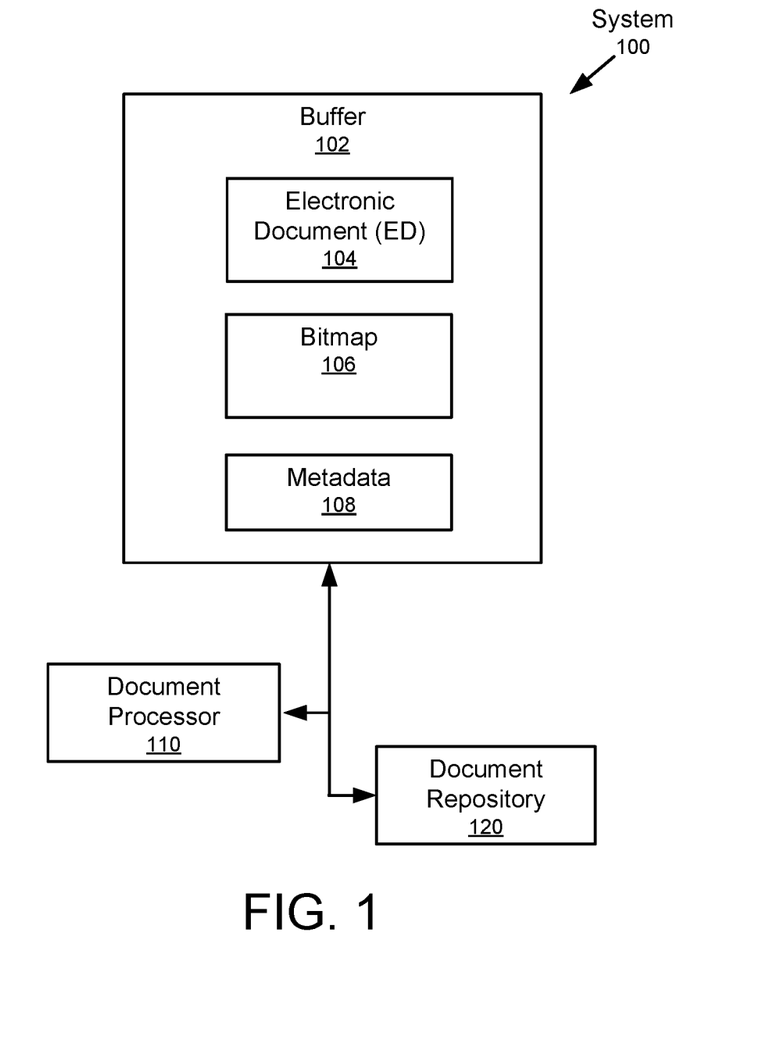
FIG. 1 shows a system in accordance with one or more embodiments of the invention.

FIG. 1 shows a system (100) in accordance with one or more embodiments of the invention. As shown in FIG. 1, the system (100) has multiple components, including, for example, a buffer (102), a document processor (110), and a document repository (120). Each of these components (102, 110, and 120) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the buffer (102) may be implemented in hardware (i.e., circuitry), software, or any combination thereof. The buffer (102) is configured to store an ED (104). The ED (104) may also include images and graphics. The ED (104) may be obtained (e.g., downloaded, scanned, etc.) from any source. The ED (104) may also be retrieved from the document repository (120). The ED (104) may be a part of a collection of EDs. Further, the ED (104) may be of any size and in any format (e.g., PDF, PostScript, OOXML, ODF, HTML, DOC, DOCX, TXT, RTF, PNG, BMP, JPG etc.).

In one or more embodiments of the invention, the document processor (110) may be implemented in hardware (i.e., circuitry), software, or any combination thereof. The document processor (110) processes the ED (104) to generate a bitmap (106) and a metadata (108). The bitmap (106) and the metadata (108) of the ED (104) may be stored in the buffer (104).

Furthermore, in one or more embodiments of the invention, the document processor (110) may retrieve the metadata (108) from a structured ED. That is, the input to the document processor (110) may be a structured ED that may have existing metadata and the document processor (110) may generate a new bitmap (106) and a new metadata (108). One or more distinctions between processing structured and unstructured EDs are discussed further below with reference to FIG. 2.

In one or more embodiments of the invention, the bitmap (106) may be a rendered version of the ED (e.g., JPG, PNG, BMP, etc.). In this way, the bitmap (106) may be generated from a scanned, downloaded, or otherwise captured document, as mentioned above. The bitmap (106) may contain text and/or images. Furthermore, the bitmap (106) may represent an unstructured ED.

In one or more embodiments of the invention, the metadata (108) may include one or more layout and styling details of the ED (104). For example, the layout and styling attributes may include margins, column details, text styling, etc. Conceptually, the metadata (108) may be considered the structure of a structured ED. In other words, in one or more embodiments, the metadata (108) in combination with the bitmap (106) may represent a structured ED.

In one or more embodiments of the invention, the layout information may be used to determine and/or calculate one or more text layout attributes that identify the underlying structure of the ED. For example, the layout information in the metadata may further include attributes such as a centering attribute, a white space attribute, etc. Examples of layout and styling metadata are described in more detail below with reference to FIGS. 4A and 4B.

In one or more embodiments of the invention, the document repository (120) may contain a variety of EDs. As mentioned above, EDs may be of any size and in any format (e.g., PDF, PostScript, OOXML, ODF, HTML, DOC, DOCX, TXT, RTF, PNG, BMP, JPG etc.). Furthermore, the document repository (120) may store EDs that have been, for example, scanned into the system or downloaded. Additionally, the document repository (120) may contain both structured and unstructured EDs. Further, the document repository (120) may be subdivided into additional ED repositories. For example, the document repository (120) may be subdivided into a training data set and an evaluation data set.

Although the system (100) is shown as having three components (102, 110, 120), in other embodiments of the invention, the system (100) may have more or fewer components. Further, the functionality of each component described above may be split across components. Further still, each component (102, 110, and 120) may be utilized multiple times to carry out an iterative operation.

Figure 2:
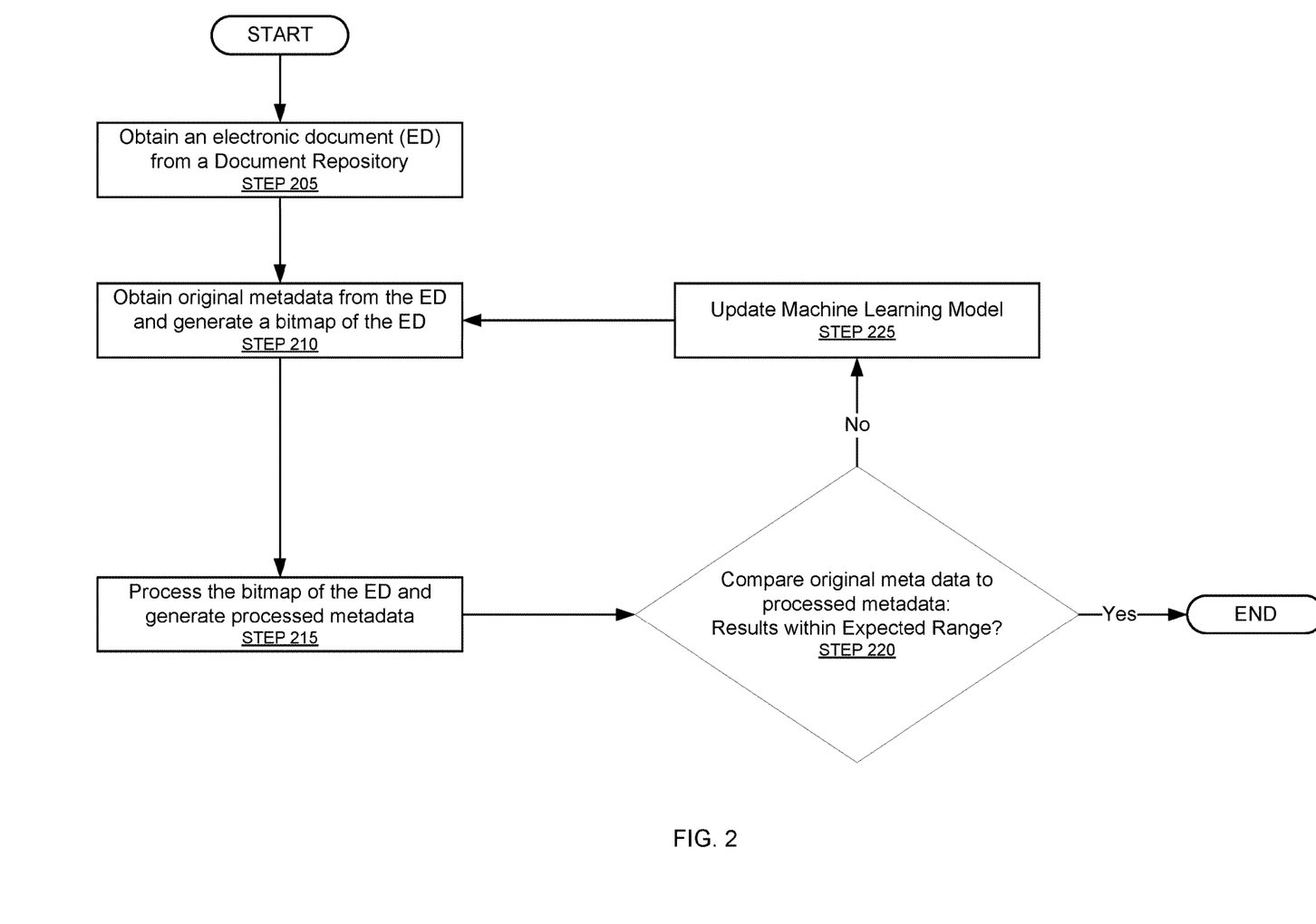
FIG. 2 shows a flowchart in accordance with one or more embodiments of the invention.

FIG. 2 shows a flowchart in accordance with one or more embodiments of the invention. The flowchart depicts a process for training a machine learning model to process EDs. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Referring to FIG. 2, initially, an ED is obtained (STEP 205) from a document repository. The ED may be part of a collection of EDs. Further, for the purposes of training the machine learning model, the ED may be of any size and in any structured format (e.g., OOXML, HTML, DOC, DOCX, TXT, RTF, etc.).

In STEP 210, the original metadata is extracted from the ED and a bitmap of the ED is generated. As discussed above, the original metadata may be any parameters describing the structure of the ED. That is, metadata is obtained from the ED that describes various aspects affecting the layout of the ED.

In STEP 215, the bitmap of the ED is processed such that a processed metadata is generated. The processed metadata may be derived by applying one or more machine learning models to the bitmap of the ED. In other words, the machine learning model may effectively "guess" at the layout parameters of the ED based on various image recognition and processing techniques applied to the bitmap of the ED. For example, a reasonable "guess" as to margins as seen on the bitmap image could be done by measuring a bounding box of all the text in the bitmap. However, this may or may not be completely accurate, because words may be kept intact when wrapping to another line or the text may not rest fully against the margins. Those skilled in the art will appreciate that a variety of different image processing methods may be applied to estimate or otherwise calculate the various layout properties of the bitmap such that metadata of the ED may be generated.

In STEP 220, the original metadata of the ED is compared with the metadata generated as a result of processing the ED. If the comparison is within an expected range or threshold, then the process ends. In one or more embodiments, the process may end by storing the bitmap and generated metadata. However, the process may also end by providing an indication to the machine learning model that the generated data is within an acceptable limit.

In one or more embodiments, the threshold may be expressed as a percentage. For example, in one or more embodiments, an acceptable limit may be if the values of the generated metadata are within 10% of the values in the original metadata. Those skilled in the art will appreciate that a variety of ranges or thresholds may be set. Furthermore, the ranges or thresholds may be different for each parameter in the metadata (e.g., left margin, right margin, left alignment, center alignment, justified, etc.). Alternatively or additionally, the ranges or thresholds may be based on an aggregation of differences of the values between the original metadata and the generated metadata. Further, the expected range or threshold may be predetermined or may be determined in real-time. Moreover, the expected range or threshold may be changed over time (e.g., as the process improves the tolerances may be tightened over time). In one or more embodiments, if the comparison is not within an expected range or threshold, then the process proceeds to STEP 225.

In STEP 225, the process indicates to the machine learning model that the generated metadata was not within the particular expected range or threshold. The machine learning model may then be updated to more accurately process the ED and generate metadata. The process may indicate to the machine learning model in which direction a parameter of the metadata may have been off. For example, the process may feed back a difference between the generated margins and the margins from the original metadata. The machine learning model may then be updated or tuned to reflect these differences. The process may then proceed back to STEP 210. That is, after the machine learning model is updated, the process again obtains the original metadata from the ED and the ED is processed such that a bitmap of the ED and a processed metadata is generated. The process may be repeated until the machine learning model reaches an acceptable threshold. Additionally, the process may be repeated with several EDs to continue fine-tuning the machine learning model. The several EDs may be the same or different formats.

Figure 3:
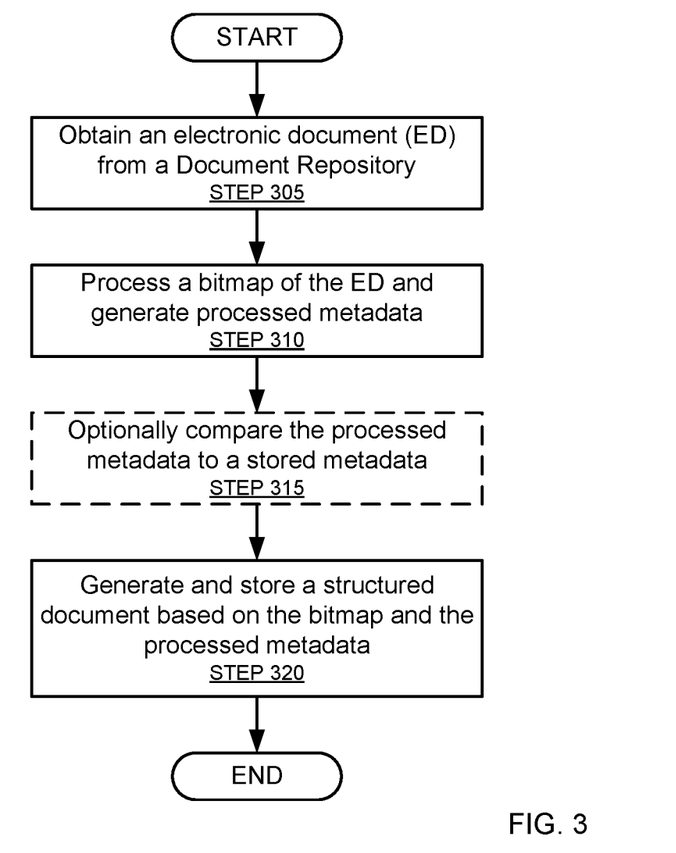
FIG. 3 shows a flowchart in accordance with one or more embodiments of the invention.

FIG. 3 shows a flowchart in accordance with one or more embodiments of the invention. The flowchart depicts a process for generating a structured ED from an unstructured ED. One or more of the steps in FIG. 3 may be performed by the components of the system (100), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Referring to FIG. 3, initially, an ED is obtained (STEP 305) from a document repository. The ED may be part of a collection of EDs. Further, the ED may be of any size and in any format (e.g., PDF, PostScript, OOXML, ODF, HTML, DOC, DOCX, TXT, RTF, PNG, BMP, JPG etc.).

In STEP 310, the ED is processed such that a bitmap of the ED and a processed metadata is generated. The processed metadata may be derived by applying one or more machine learning models to the ED. Similar to the discussion above, one or more embodiments in accordance with FIG. 3 may effectively "guess" at the layout parameters of the ED based on various image recognition and processing techniques. For example, a reasonable "guess" as to margins as seen on the bitmap image could be done by measuring a bounding box of all the text in the bitmap. However, this may or may not be completely accurate, because words may be kept intact when wrapping to another line or the text may not rest fully against the margins. Those skilled in the art will appreciate that a variety of different image processing methods may be applied to estimate or otherwise calculate the various layout properties of the bitmap such that metadata of the ED may be generated.

In STEP 315, the process may optionally compare the processed metadata to a stored metadata. A stored metadata may either be from an original structured ED or may have been previously generated. However, there may also not be any previously stored metadata (e.g., a previously unprocessed unstructured ED).

In STEP 320, the process generates a structured ED based on the bitmap and the processed metadata. The generated structured ED may then be stored in a document repository. Alternatively or additionally, the structured ED may then also be edited by a user or other program.

Figure 4A:
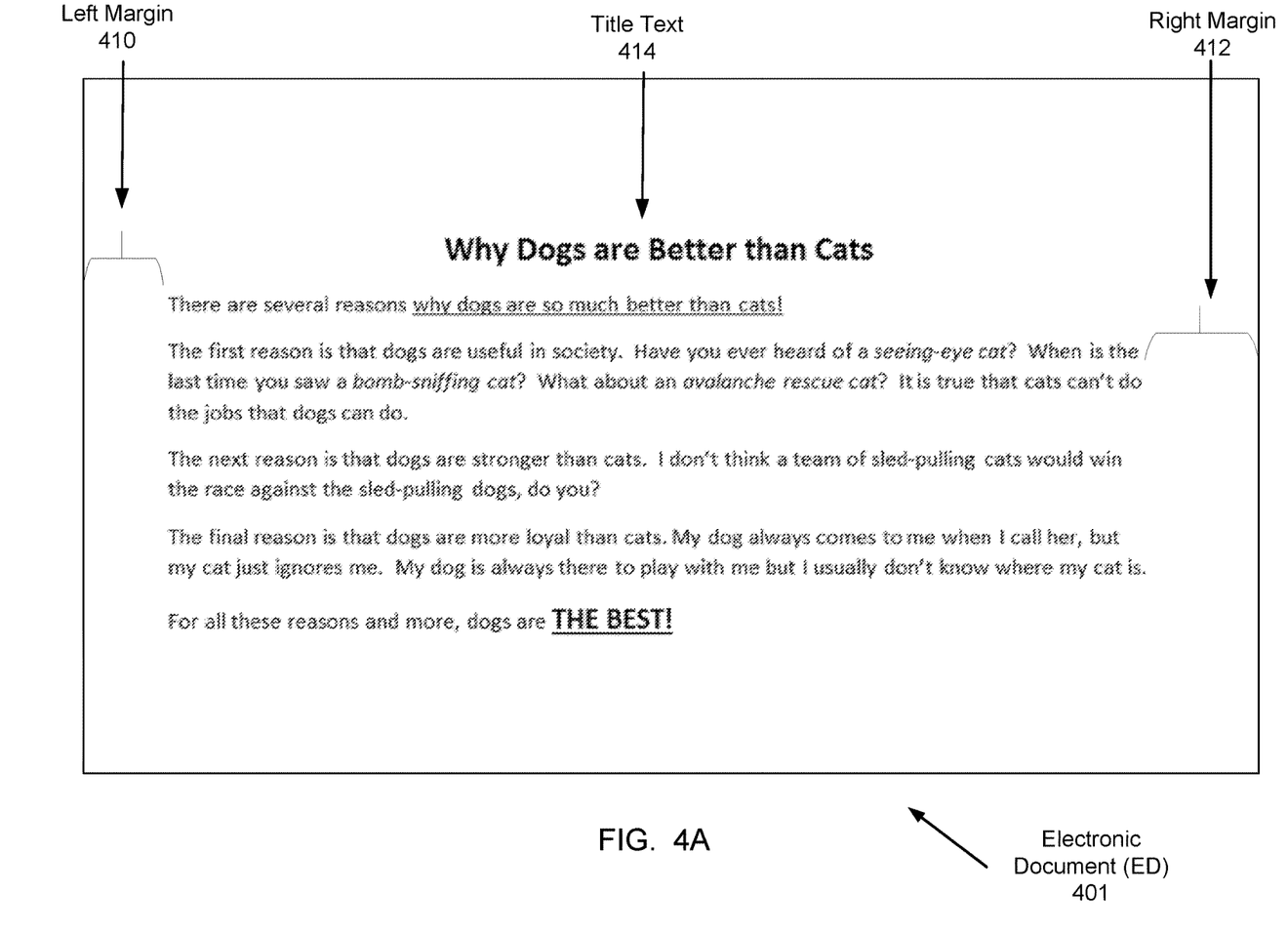
FIGS. 4A-4B show examples in accordance with one or more embodiments of the invention.
Figure 4B:
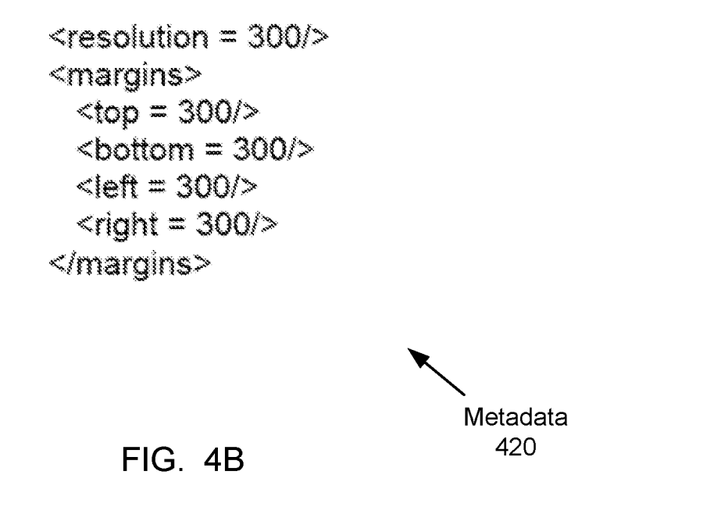

FIGS. 4A-4B show examples in accordance with one or more embodiments of the invention. The example ED processing methods described above in reference to FIG. 2 are applied in the examples shown in FIGS. 4A-4B. However, it will be apparent to one of ordinary skill in the art that different ED processing methods may be applied.

FIG. 4A shows an example of an ED (401). In one or more embodiments, the ED (401) may be a structured ED (i.e., it has metadata). The ED (401) may also be an unstructured ED (i.e. it has no metadata).

With regard to the case where the ED (401) is a structured ED, the ED (401) may have various parameters describing its layout. For example, the ED (401) may have a left margin (410) and a right margin (412). Furthermore, the ED (401) may have a Title Text (414) that is distinct from the text of the remainder of the ED (e.g., larger font, center aligned, etc.).

With regard to a case where the ED (401) is an unstructured ED, the various parameters describing its layout may be derived by the processes according to FIG. 2 or FIG. 3.

FIG. 4B shows an example of metadata (420). In one or more embodiments, the metadata (420) may be contained within a structured ED. However, the metadata (420) may be generated according to the processes described in FIG. 2 or FIG. 3. As shown by the example in FIG. 4B, the metadata (420) may contain the resolution of the ED. As shown in FIG. 4B, the resolution of the ED is 300 dots per inch (DPI) (also referred to as pixels per inch or PPI). Further, in this example there is a margin parameter for the top, bottom, left, and right of the ED. In this example, each of the margins is 300. Put differently, each of the margins of the ED would be one inch (i.e. 300 pixels at 300 PPI). Those skilled in the art will appreciate that the metadata (420) may contain any of a variety of parameters describing the layout of a structured ED. Moreover, in one or more embodiments, the metadata (420) may correspond to the parameters defined by a particular ED format (e.g., OOXML, DOCX).

Figure 5:
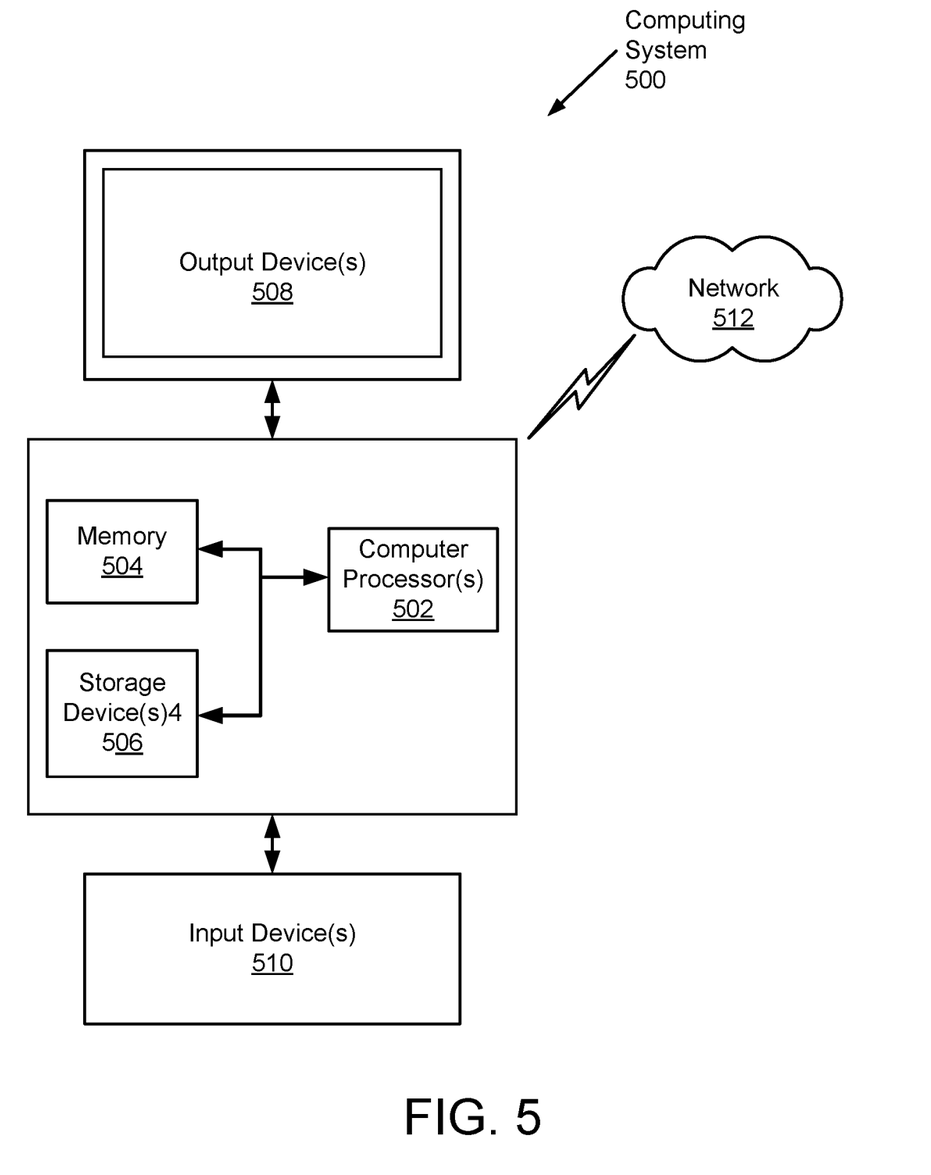
FIG. 5 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and be connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for training a machine learning model to process electronic documents (EDs), the method comprising:
   obtaining a structured ED (SED) from a document repository, wherein the SED comprises a first metadata;
   generating a bitmap comprising an image representation of the SED;
   generating, based on the bitmap, a second metadata;
   determining whether the second metadata is within a predetermined threshold of the first metadata;
   updating the machine learning model and generating, based on the bitmap and in response to determining that the second metadata is not within the predetermined threshold of the first metadata, a third metadata;
   determining whether the third metadata is within the predetermined threshold of the first metadata; and
   storing, in response to determining that the third metadata is within the predetermined threshold of the first metadata, a second SED comprising the bitmap and the third metadata.

2. The method of claim 1, further comprising:
   obtaining a third SED from the document repository, wherein the third SED comprises a fourth metadata;
   generating a second bitmap comprising an image representation of the third SED;
   generating, based on the second bitmap, a fifth metadata;
   determining whether the fifth metadata is within the predetermined threshold of the fourth metadata; and
   storing, in response to determining that the fifth metadata is within the predetermined threshold of the fourth metadata, a fourth SED comprising the second bitmap and the fifth metadata.

3. The method of claim 1, further comprising:
   obtaining an unstructured ED (UED);
   generating, based on the UED, a third bitmap and a fifth metadata; and
   storing a third SED comprising the third bitmap and the fifth metadata.

4. The method of claim 3, wherein the UED comprises one or more scanned images of a physical document.

5. The method of claim 3, wherein the UED comprises one or more images.

6. The method of claim 3, wherein the UED is in a format selected from a list consisting of: PDF, PostScript, PNG, BMP, and JPG.

7. The method of claim 1, wherein the SED is in a format selected from a list consisting of: OOXML, ODF, HTML, DOC, DOCX, TXT, RTF.

8. A non-transitory computer readable medium (CRM) storing computer readable program code for training a machine learning model to process EDs and the computer readable program code causes a computer to:
   obtain a structured ED (SED) from a document repository, wherein the SED comprises a first metadata;
   generate a bitmap comprising an image representation of the SED;
   generate, based on the bitmap, a second metadata;
   determine whether the second metadata is within a predetermined threshold of the first metadata;
   update the machine learning model and generate, based on the bitmap and in response to determining that the second metadata is not within the predetermined threshold of the first metadata, a third metadata;
   determine whether the third metadata is within the predetermined threshold of the first metadata; and
   store, in response to determining that the third metadata is within the predetermined threshold of the first metadata, a second SED comprising the bitmap and the third metadata.

9. The non-transitory CRM of claim 8, wherein the computer readable program code further causes the computer to:
   obtain a third SED from the document repository, wherein the third SED comprises a fourth metadata;
   generate a second bitmap comprising an image representation of the third SED;
   generate, based on the second bitmap, a fifth metadata;
   determine whether the fifth metadata is within the predetermined threshold of the fourth metadata; and
   store, in response to determining that the fifth metadata is within the predetermined threshold of the fourth metadata, a fourth SED comprising the second bitmap and the fifth metadata.

10. The non-transitory CRM of claim 8, wherein the computer readable program code further causes the computer to:
    obtain an unstructured ED (UED);
    generate, based on the UED, a third bitmap and a fifth metadata; and
    store a third SED comprising the third bitmap and the fifth metadata.

11. The non-transitory CRM of claim 10, wherein the UED comprises one or more scanned images of a physical document.

12. The non-transitory CRM of claim 10, wherein the UED comprises one or more images.

13. The non-transitory CRM of claim 10, wherein the UED is in a format selected from a list consisting of: PDF, PostScript, PNG, BMP, and JPG.

14. The non-transitory CRM of claim 8, wherein the SED is in a format selected from a list consisting of: OOXML, ODF, HTML, DOC, DOCX, TXT, RTF.

15. A system for training a machine learning model to process EDs, the system comprising:
    a memory; and
    a computer processor connected to the memory that:
    obtains a structured ED (SED) from a document repository, wherein the SED comprises a first metadata;
    generates a bitmap comprising an image representation of the SED;
    generates, based on the bitmap, a second metadata;
    determines whether the second metadata is within a predetermined threshold of the first metadata;
    updates the machine learning model and generates, based on the bitmap and in response to determining that the second metadata is not within the predetermined threshold of the first metadata, a third metadata;
    determines whether the third metadata is within the predetermined threshold of the first metadata; and
    stores, in response to determining that the third metadata is within the predetermined threshold of the first metadata, a second SED comprising the bitmap and the third metadata.

16. The system of claim 15, wherein the processor further:
    obtains a third SED from the document repository, wherein the third SED comprises a fourth metadata;
    generates a second bitmap comprising an image representation of the third SED;
    generates, based on the second bitmap, a fifth metadata;
    determines whether the fifth metadata is within the predetermined threshold of the fourth metadata; and stores, in response to determining that the fifth metadata is within the predetermined threshold of the fourth metadata, a fourth SED comprising the second bitmap and the fifth metadata.

17. The system of claim 15, wherein the processor further:
obtains an unstructured ED (UED);
generates, based on the UED, a third bitmap and a fifth metadata; and
stores a third SED comprising the third bitmap and the fifth metadata.

18. The system of claim 17, wherein the UED comprises one or more scanned images of a physical document.

19. The system of claim 17, wherein the UED is in a format selected from a list consisting of: PDF, PostScript, PNG, BMP, and JPG.

20. The system of claim 15, wherein the SED is in a format selected from a list consisting of: OOXML, ODF, HTML, DOC, DOCX, TXT, RTF.

* * * * *